United States Patent [19]

Schlagenhauf

[11] 4,142,589
[45] Mar. 6, 1979

[54] CULTIVATOR DISK SHIELD ASSEMBLY

[76] Inventor: Alan L. Schlagenhauf, R.R. #3, Bluffton, Ind. 46714

[21] Appl. No.: 797,456

[22] Filed: May 16, 1977

[51] Int. Cl.² .............................................. A01B 39/26
[52] U.S. Cl. .................................... 172/510; 172/624
[58] Field of Search .............. 172/509, 510, 417, 657, 172/484, 624, 511, 508, 513

[56] References Cited

U.S. PATENT DOCUMENTS

| 1,349,419 | 8/1920 | Garst | 172/510 |
|---|---|---|---|
| 1,526,586 | 2/1925 | Becker | 172/602 |
| 2,420,973 | 5/1947 | Petersen | 172/657 X |
| 2,713,817 | 7/1955 | Coyle | 172/511 |
| 3,247,911 | 4/1966 | Erickson | 172/510 |
| 3,327,786 | 6/1967 | Meyer | 172/484 |
| 3,429,379 | 2/1969 | Tebben | 172/510 |
| 3,502,157 | 3/1970 | Coats | 172/741 |
| 3,526,281 | 9/1970 | Meaden | 172/510 |
| 3,621,922 | 11/1971 | Hinken | 172/555 |

FOREIGN PATENT DOCUMENTS 670102  9/1963  Canada .................................... 172/513

OTHER PUBLICATIONS

Glencoe Row and Crop Cultivators – Advertizing Brochure of Dynamics Corp., Glencoe, Minn., 9/26/72.
Operator's Manual OM-N97720, John Deere, RG Series Row-Crop Cultivators, pp. 42, 43.

Primary Examiner—Richard J. Johnson
Attorney, Agent, or Firm—Gust, Irish, Jeffers & Rickert

[57] ABSTRACT

A cultivator having a rigid frame adapted to be connected to a tractor, at least one pair of laterally spaced-apart plow elements for breaking up the surface of the ground independently connected to the frame by a pair of linkages, and a pair of laterally spaced-apart rolling disk shield assemblies suspended from the lost motion linkages. The disk shield assemblies are comprised of first and second supporting arms rigidly connected respectively to the lost motion linkages and which extend outwardly away from the plow elements, a lever rotatably connected to and depending from each of the supporting arms, and a disk shield rotatably mounted on each of the levers and positioned generally between and adjacent the plow elements.

10 Claims, 5 Drawing Figures

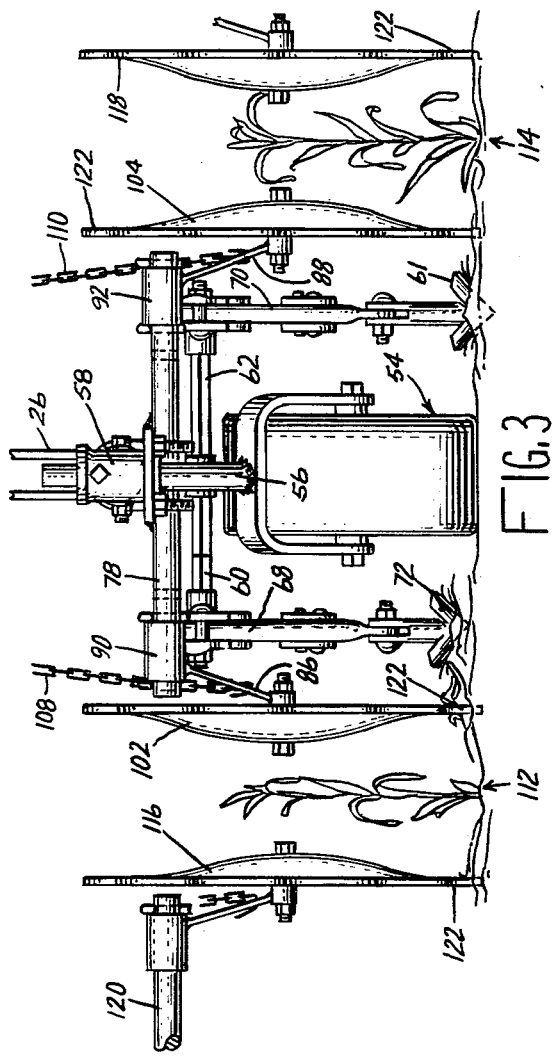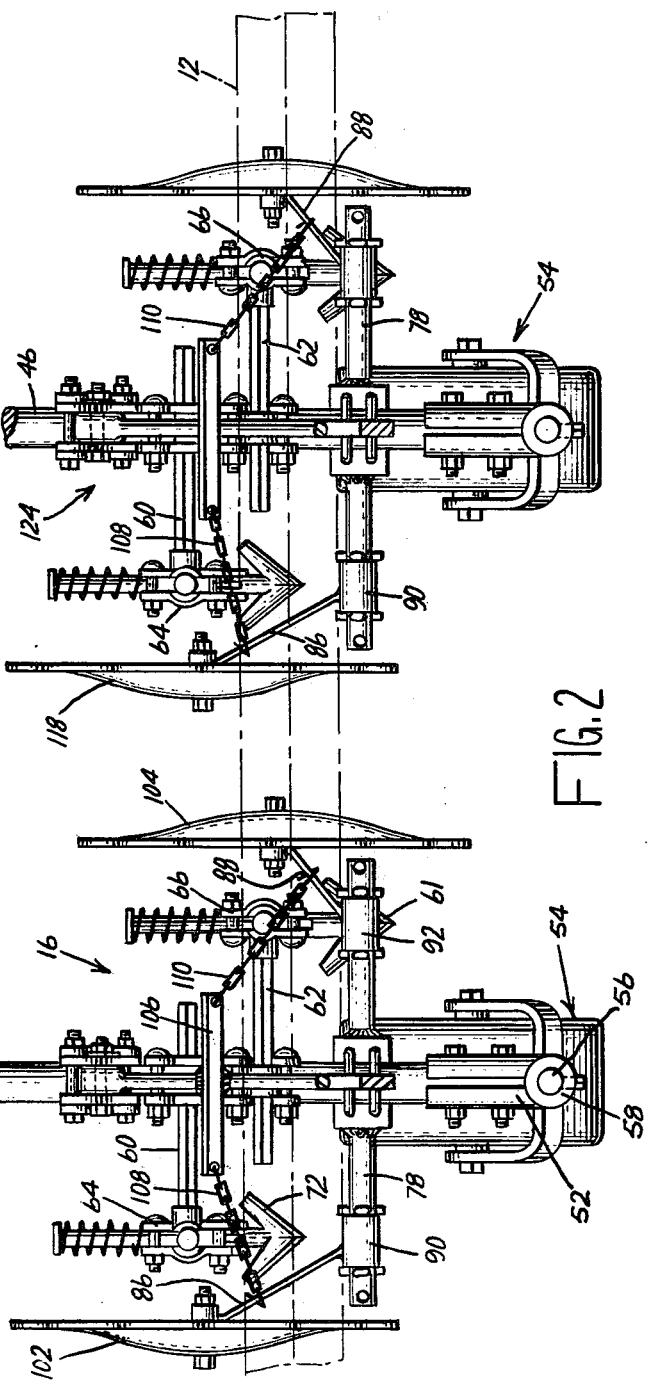

CULTIVATOR DISK SHIELD ASSEMBLY

BACKGROUND OF THE INVENTION

1. Field of the Invention

The present invention relates to cultivators for row crops, and in particular to means for mounting rolling disk shields on the cultivator.

2. Description of the Prior Art

Prior art cultivators for row crops, such as corn and soy beans, often employ a pair of rotary, row-defining disks mounted on a common shaft attached to a transverse tool bar which supports the entire cultivator assembly. The purpose of these disks is to prevent the dirt which is thrown up by the cultivator plow elements from covering the young plants, and for this reason, they are normally positioned such that they follow parallel paths on either side of and in fairly close proximity to the row.

One such prior art disk shield assembly is shown in U.S. Pat. No. 3,502,157 and comprises a pair of laterally spaced-apart coaxial disks rotatably mounted on a pivoted support arm which extends between them. The pivoted arm is supported by a second arm which is rigidly clamped to the tool bar. The primary drawback to this arrangement is that plants which are taller than 9 or 10 inches are knocked down or damaged by the pivoted arm which supports the disks. Furthermore, the entire disk assembly is supported directly by the rigid tool bar and the free end of the pivot arm is suspended from the bar by means of a chain which limits the level to which the disks can drop. Although the plow elements on many prior art cultivators are connected to the tool bar through a linkage which minimizes the effect of tool bar movement during operation, if the suspension chains of the above-described prior disk shield assembly are taut, the disks may be raised off the ground upon upward tool bar movement or when a depression or gully in the ground is encountered.

SUMMARY OF THE INVENTION

The present invention overcomes the drawbacks of the prior art apparatus discussed above in that each disk is independently supported on a pivoted lever which in turn is rigidly secured to the linkage which supports the cultivating plow elements. This enables each disk to follow the movement of its respective shovel or sweep regardless of the terrain or movement of the tool bar. Since the disks are connected to the tool bar through the lost motion linkage, they are further isolated from any tool bar motion which results from the tractor traversing uneven terrain. Furthermore, there are no mounting arms between the row-defining disks to knock down or otherwise damage taller plants.

More specifically, the present invention is concerned with a cultivator having a rigid frame adapted to be connected to a towing vehicle, at least one pair of laterally spaced-apart tools for breaking up the surface of the ground independently connected to the frame respectively by a pair of linkages, and a rolling shield assembly which comprises: first and second supporting arms rigidly connected respectively to the lost motion linkages and extending laterally toward the row line defined between the tools, a lever rotatably connected to and depending from each of the supporting arms, and a disk shield rotatably mounted on each of the levers, the disks being positioned generally between the pair of tools and respectively adjacent individual ones of the pair of tools.

It is accordingly an object of the present invention to provide a disk shield assembly for cultivators wherein each disk is independently supported by the same linkage which supports the associated cultivating tool thereby providing corresponding movement between the tools and their respective disks.

Another object of the present invention is to provide a disk shield assembly for cultivators wherein the disks are independently supported by arms on either side of a row so that there are no obstructions to knock down or damage taller plants.

It is a further object of the present invention to provide a disk shield assembly for cultivators in which the disks are connected to the tool bar by independent linkages so as to isolate the disks from the vertical movement of the bar.

Yet another object of the present invention is to provide a disk shield assembly which may be readily adapted to existing cultivators.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 2 is a fragmentary top plan view of the cultivator of FIG. 1 showing two adjacent pairs of disks;

FIG. 3 is a fragmentary front elevational view of the cultivator showing two pairs of disk shields straddling adjacent rows of plants;

DESCRIPTION OF THE PREFERRED EMBODIMENT

Figure 1:
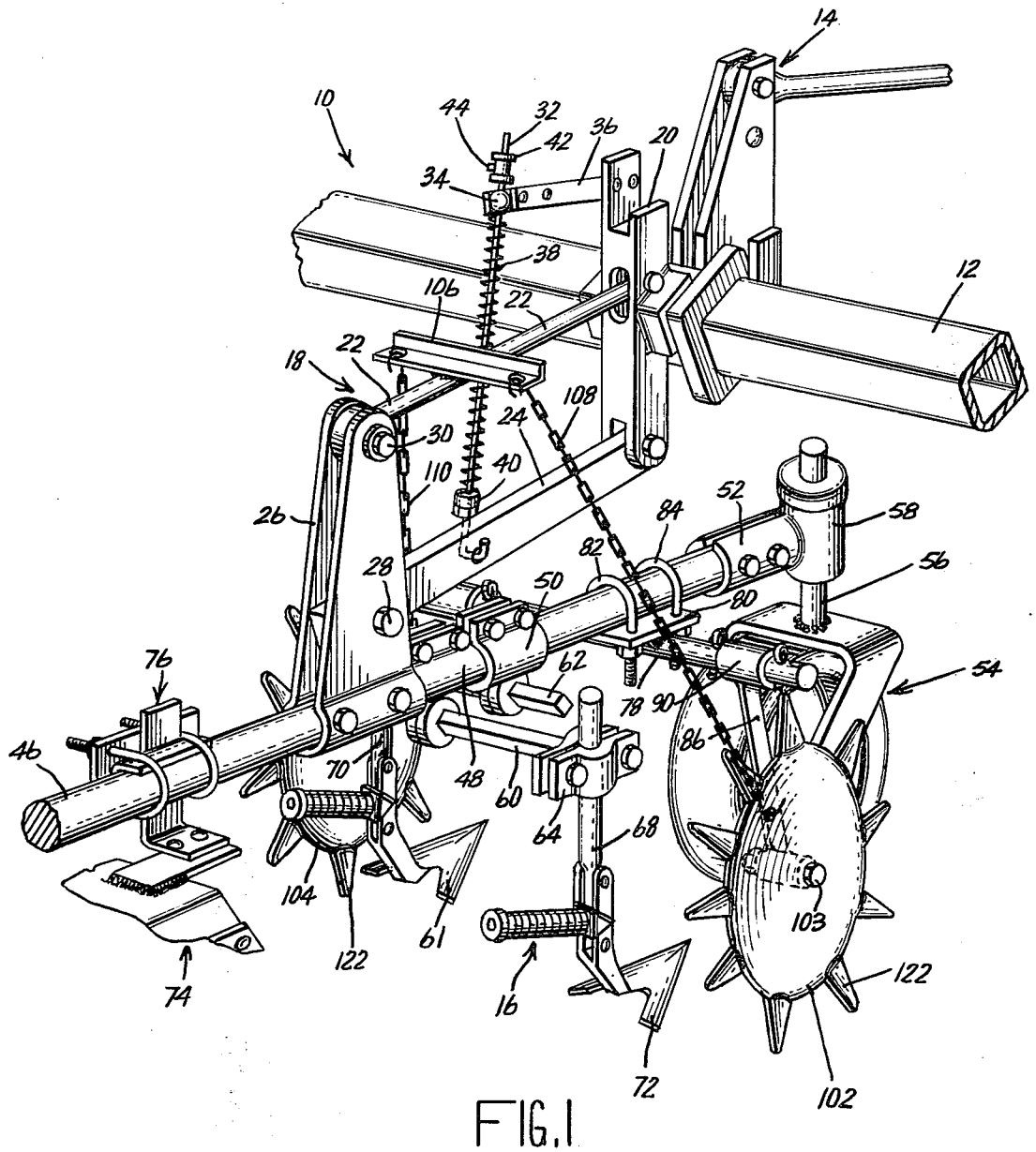
FIG. 1 is a fragmentary perspective view of a cultivator having the disk shield assembly of the present invention thereto.

Referring now to the drawings, one cultivator assembly 10 having a disk shield assembly according to the present invention mounted thereto is shown. Hollow, rectangular tool bar 12 is adapted to be connected to a tractor (not shown) by means of a conventional hitch including element 14, and is towed thereby in the customary manner. Plow and disk assembly 16 is mounted on tool bar 12 through parallel bar linkage 18. Linkage 18 comprises mounting bracket 20 which is rigidly secured to bar 12, a pair of connecting arms 22 and 24 pivotally secured to bracket 20, and coupler plates 26 which are pivotally connected to arms 22 and 24 by means of stud 28 and tilt adjusting bolt 30. Coupler plates 26 are adjusted by means of pivot stud 28 so that they are tight enough to eliminate side movement yet sufficiently loose that assembly 16 will follow the level of the ground being traversed.

Rigid lift rod 32 hooks through connecting arm 24 and is slidably received in sleeve 34 in arm 36, the latter being rigidly fastened to mounting bracket 20. Spring 38 around rod 32 is positioned between sleeve 34 and lower collar 40 and serves to exert downward pressure on the plow and disk assembly 16 through connecting arm 24. Upper collar 42 is tightened on rod 32 by means of set screw 44 and enables the plow and disk assembly to be raised as tool bar 12 is rotated. Upper collar 42 is normally adjusted so that there is a space of one or two inches between it and sleeve 34 during cultivating and serves to isolate assembly 16 from the motion of tool bar 12 as the tractor transverses uneven ground.

Rig bar 46 is rigidly fastened to coupler plates 26 and carries rig clamps 48, 50, and wheel clamp 52. Castering wheel 54 having stub pivot shaft 56 is rotatably received within sleeve portion 58 of clamp 52 and serves to determine the depth of plow elements 61, 72. Height adjustment means (not shown) for castering wheel 54 are provided.

Cross arms 60, 62 are rigidly secured within clamps 48, 50, respectively, and support shank clamps 64, 66 (FIG. 2). Shanks 68, 70 are clamped within shank clamps 64, 66, respectively, and carry plow elements 61, 72 in a manner well known in the art. Obviously, other cultivating tools such as standards, shovels, spear points and knives may be utilized in place of plow elements or sweeps 61, 72 depending on the particular application. If desired, a further implement such as enclosed sweep 74 may be mounted to rig pipe 48 by means of another clamp assembly 76.

Figure 5:
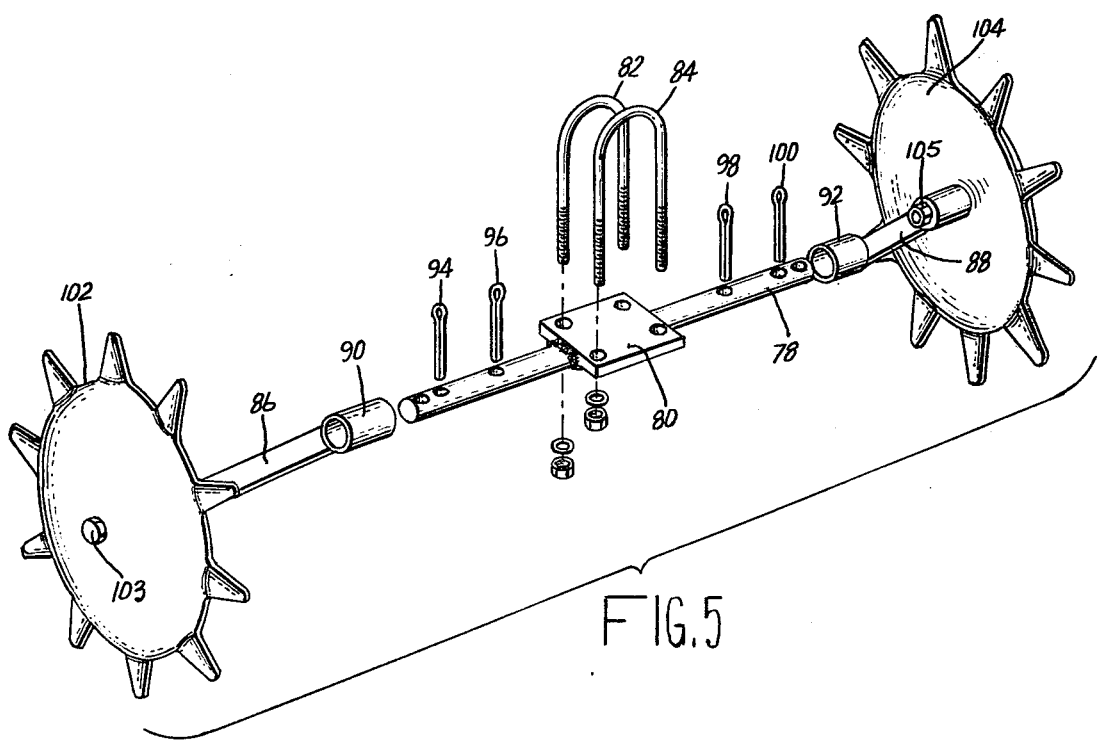
FIG. 5 is an exploded perspective view of the disk assembly according to the present invention.

The disk shield according to the present invention (FIG. 5) comprises transverse shaft 78 welded or otherwise secured to plate 80, which in turn is rigidly mounted on rig bar 46 by means such as U-bolts 82, 84. Lever arms 86, 88 include sleeves 90, 92 which are loosely positioned around the shaft 78 so that they are free to rotate. Pins 94, 96 and 98, 100 lock sleeves 90, 92 against lateral movement on shaft 78.

Figure 4:
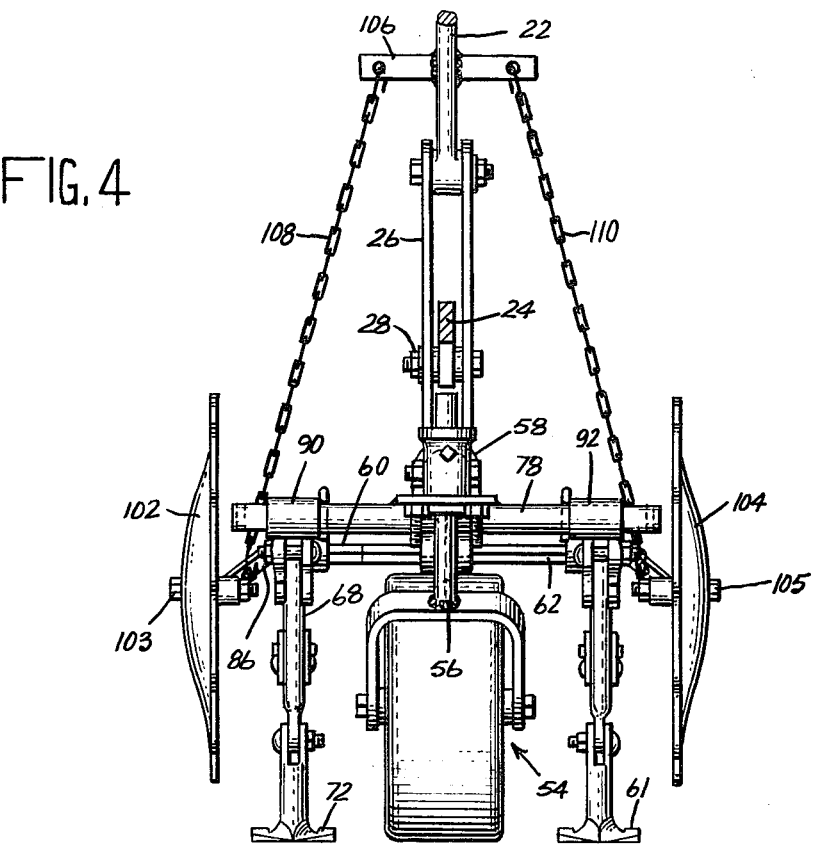
FIG. 4 is a fragmentary front elevational view of one of the cultivator assemblies showing the disks suspended above the level of the plow elements.

Disk shields 102, 104 are respectively rotatably mounted on the free ends of lever arms 86, 88 by means of pins 103, 105. As shown in FIG. 4, arms 86, 88 are partially suspended from bracket 106 by chains 108, 110. Bracket 106 in turn is welded or otherwise secured to connecting arm 22 of linkage 18. If desired, the effective length of chains 108, 110 may be adjusted.

In practice, a gang of such cultivator rigs 16 is mounted on tool bar 12 so that two or more rows of plants may be cultivated simultaneously. Referring to FIG. 3, cultivation of two rows of plants 112, 114 is shown and it will be seen that disks 102, 116 define the row for plants 112 and that disks 104, 118 define the row for plants 114. Since the disks 102, 104 are supported independently of their adjacent disks 116, 118, respectively, no obstructions in line with the plant rows are present. This enables much taller plants to be cultivated by means of a rolling disk cultivator than has heretofore been possible.

The depth of plow elements 72, 61 is set by the height of wheel 54 and since disks 116, 102, 104 and 118 are pivotally mounted on their respective arms such as 120, 78, they are independently free to roll over the surface of the ground. The presence of teeth 122 permits a certain degree of penetration into the soil thereby driving the disks 116, 102, 104 and 118. During cultivating, disks 116, 102 and 104, 118 prevent dirt thrown up by plow elements 72, 61 from reaching and covering plants 112, 114, respectively. This enables the soil to be cultivated in close proximity to the plants 112, 114 without damage thereto.

Since disks 102, 104 are connected to tool bar 12 through the same linkage 18 as are the plow elements 72, 61, they will follow plow elements regardless of the terrain. For example, should a small depression or gully be encountered, wheel 54 and plow elements 72, 61 will follow the contour of the depression due to the downward pressure exerted by spring 38. Likewise, disks 102, 104 will drop into the depression regardless of the degree of slack in chains 108, 110 because they are supported from linkage 18 rather than the tool bar 12 as in the prior art apparatus. Rotational motion of tool bar 12 caused by the towing vehicle traversing uneven terrain is isolated from plow elements 61, 72 and disks 102, 104 by virtue of the lost motion linkage 18 described in detail above.

With reference to FIG. 2, rig 124 is identical to rig 16. It will be obvious that as many rigs 16, 124 as desired may be employed. Furthermore, other cultivating apparatus such as coulters, weeders, etc. may be attached in accordance with customary practice While there have been described above the principles of this invention in connection with specific apparatus, it is to be clearly understood that this description is made only by way of example and not as a limitation to the scope of the invention.

What is claimed is:

1. In a cultivator having a rigid transverse frame member adapted to be connected to a towing vehicle, a linkage connected to said transverse frame member, said linkage comprising first and second generally vertically spaced interconnected arms vertically moveable relative to said frame member, a generally horizontally disposed rig bar assembly connected to said rig bar assembly is vertically moveable relative to said frame member, and a pair of cultivating tools connected to said rig bar assembly, the improvement being a rolling disk shield assembly on said cultivator comprising:

first and second pivot support means connected to said rig bar assembly and extending outward toward opposite side thereof, a lever independently, pivotally connected to and depending from each said pivot support means for free vertical movement relative to said rig bar assembly, a single, shielding disk rotatably mounted on each of said levers so as to be independently, vertically moveable relative to said rig bar assembly, said disks being positioned respectively on opposite sides of said rig bar assembly adjacent to respective said cultivating tools with a portion of said disks trailing said tools, said disks having concave sides facing said tools, and means for adjusting the lateral positions of said disks relative to said rig bar assembly, whereby when the cultivator is pulled down a plurality of adjacent plant rows, there is no tangible structure other than said frame member above the respective plant row located laterally adjacent each of said disks.

2. A combination of claim 1 including a pair of flexible link means for suspending said levers from said linkage.

3. The combination of claim 2 wherein said link means are respectively adjustable in length so as to vary the level of said disks.

4. The combination of claim 2 wherein said link means are chains.

5. The combination of claim 1 wherein said frame member comprises a rectangular tool bar to which said linkages are secured.

6. A combination of claim 1 including means for spring biasing said linkage downwardly.

7. The combination of claim 1 comprising another said cultivator and rolling disk shield assembly laterally spaced from said first mentioned cultivator and rolling disk shield assembly.

8. A combination of claim 1 wherein said pivot support means are cylindrical shafts and said levers each includes a cylindrical sleeve positioned loosely around said shafts.

9. The combination of claim 8 wherein said shafts are opposite ends of a single, cylindrical bar.

10. A combination of claim 8 including a pair of pins received in holes in said shafts on each side of the respective sleeve.

* * * * *

UNITED STATES PATENT AND TRADEMARK OFFICE
CERTIFICATE OF CORRECTION

PATENT NO. : 4,142,589
DATED : March 6, 1979
INVENTOR(S) : Alan L. Schlagenhauf

It is certified that error appears in the above-identified patent and that said Letters Patent are hereby corrected as shown below:

Claim 1, Column 4, line 29, after "to" and ahead of "said" insert -- said linkage so that --.

Claim 1, Column 4, line 36, change "side" to -- sides --.
Claim 1, Column 4, line 36, after "opposite" and ahead of "sides", insert -- lateral --.

Signed and Sealed this

Twenty-fifth Day of September 1979

[SEAL]

Attest:

LUTRELLE F. PARKER
Attesting Officer     Acting Commissioner of Patents and Trademarks